United States Patent [19]

Williamson et al.

[11] Patent Number: 4,782,527
[45] Date of Patent: Nov. 1, 1988

[54] TELEPHONE HEAD/HAND SET

[76] Inventors: Alfred T. Williamson; Kerry L. Williamson, both of 4515-33 Avenue, Edmonton, Alberta, Canada, T6L 4X8

[21] Appl. No.: 102,464
[22] Filed: Sep. 29, 1987

[30] Foreign Application Priority Data

Sep. 30, 1986 [CA] Canada .................. 519467

[51] Int. Cl.$^4$ .......................... H04R 1/03; H04R 1/05
[52] U.S. Cl. ..................................... 379/430; 379/433
[58] Field of Search .............. 379/430, 433; 381/183, 381/187

[56] References Cited

U.S. PATENT DOCUMENTS

| | | | |
|---|---|---|---|
| 2,488,181 | 11/1949 | Fallek | 379/430 |
| 2,503,846 | 4/1950 | Shann | 379/430 |
| 2,538,458 | 1/1951 | Hutchinson | 379/430 |
| 4,445,005 | 4/1984 | Furuhashi | 381/183 |

FOREIGN PATENT DOCUMENTS

| | | | |
|---|---|---|---|
| 2060888 | 6/1972 | Fed. Rep. of Germany | 379/433 |
| 1296160 | 11/1972 | United Kingdom | 381/187 |

*Primary Examiner*—Jin F. Ng
*Assistant Examiner*—Danita R. Byrd
*Attorney, Agent, or Firm*—William R. Hinds; George H. Dunsmuir

[57] ABSTRACT

A simple combination handset and headset device includes an elongated, preferably flexible body with a mouthpiece at one end thereof and an earpiece at the other end thereof, and a tubular arm pivotally connected to the mouthpiece for rotation between handset and headset positions, whereby, when the arm lies against the body, the combination can be used in the same manner as a conventional handset, and when the body is extended and the arm rotated, the combination can be used as a headset.

7 Claims, 1 Drawing Sheet

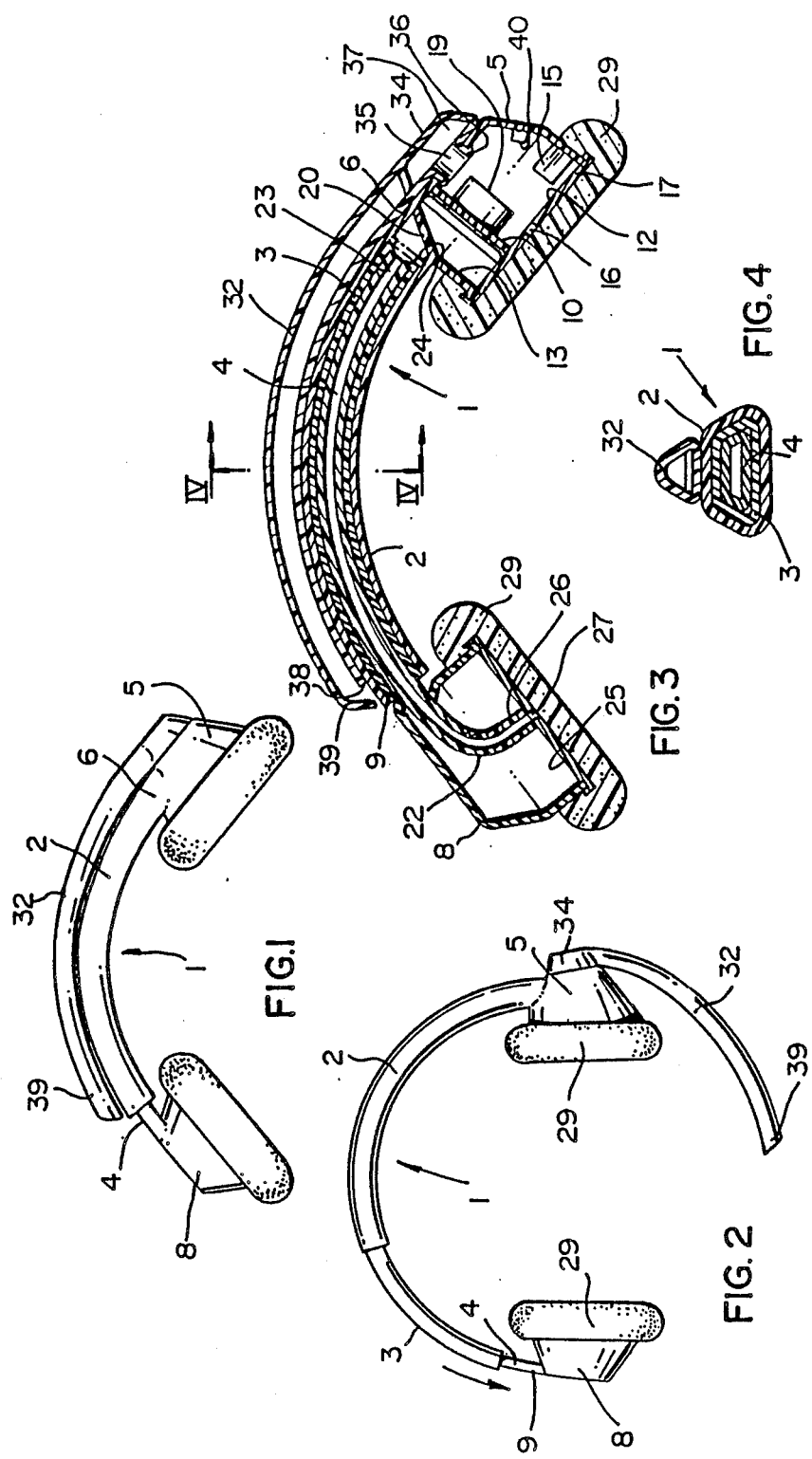

TELEPHONE HEAD/HAND SET

BACKGROUND OF THE INVENTION

This invention relates to a combination telephone handset and headset device.

The concept of a combination telephone handset and headset is believed to be both novel and of obvious utility. It will be appreciated that such a device would be useful in both the home and office, being basically a conventional hadnset which is convertible to a headset so that both hands of the user are free.

The telephone base and other communication equipment to which the hand/head set is connected is of conventional design and therefore is not described herein.

The patent literature discloses headphones bearing some similarities to the combination of the present invention. An example of such a headphone is described in U.S. Pat. No. 4,445,005, which issued to S. Furuhashi on Apr. 24, 1984. However, the patented headphone or headset cannot be used in the same manner as a conventional handset.

The object of the present invention is to provide a novel combination telephone handset and headset device, which is of relatively simple structure, and which readily converts from one mode or form to the other.

BRIEF SUMMARY OF THE INVENTION

Accordingly, the present invention relates to a combination telephone handset and headset device comprising elongated, extensible body means; mouthpiece means at one end of said body means; earpiece means at the other end of said body means; microphone means is said mouthpiece means for transmitting sound made by the user of the device; speaker means for receiving signals sent to the user of the device in said body means; and tubular arm means pivotally connected to said body means at the mouthpiece end thereof for rotation between handset and headset positions, whereby the device can be used in the same manner as a conventional handset, or, by extension of said body means and rotation of said arm means into close proximity with the mouth of the user, used as a conventional headset.

BRIEF DESCRIPTION OF THE DRAWINGS

The invention further includes hinge means interconnecting the earpiece to the tubular body to facilitate adjustment to the user's head.

The invention will now be described in greater detail with reference to the accompanying drawing, which illustrates a preferred embodiment of the invention, and wherein:

FIG. 1 is a side elevation view of the combination telephone handset and headset device of the present invention in the handset position;

FIG. 2 is a side elevation view of the device of FIG. 1 in the headset position;

FIG. 3 is a longitudinal sectional view of the device of FIGS. 1 and 2 in the handset position; and FIG. 4 is a cross section taken generally along line IV—IV of FIG. 3.

DESCRIPTION OF THE PREFERRED EMBODIMENTS

With reference to the drawing, the telephone handset and headset device of the present invention includes an elongated tubular body generally indicated at 1 typically but not necessarily of trapezoidal cross-sectional configuration (FIG. 4). The body 1 is defined by three separate tubular sections 2, 3 and 4, which are telescopically interconnected, the section 4 being slidable in the section 3, the section 3 being slidable in the section 2. In the fully retracted position (FIG. 1) the device is used as à conventional handset, and in the extended position (FIG. 2) the device is used as a headset.

A mouthpiece cup 5 is provided on the outer end 6 of the body section 2, and an earpiece cup 8 is provided on one end 9 of the body section 4. The mouthpiece cup 5 contains a partition 10 dividing the interior of the cup 5 into two separate chambers 12 and 13. One of the chambers 12 contains a microphone 15 for transmitting sound through a wire (not shown) to a connector which facilitates connection to a telephone base or other communication device. A hole 16 is provided in circular end cap 17 of the cup 5 for facilitating the entry of sound waves into the chamber 12. A speaker 19 is mounted in the partition 10, and extends into the chamber 13. The received signal is sent to the user through the connector 40 through a wire to the speaker 19 which emanates sound through an opening 20 in the body wall of the cup 5 opposite the speaker 19, and through section 4 to a flexible tube 22 into the earpiece cup 8. The open end 23 of the body section 4 abuts against a stop 24 at the open, mouthpiece end of the tubular body section 3. Tubular section 3 abuts against a stop 24 at the mouthpiece end of body section 2.

The flexible tube 22 curves sharply in the cup 8 and abuts against the circular end cap 25. The open end 26 of the tube 22 in the cup 8 surrounds an opening 27 in the circular end cap 25 of the cup 8. Foam rubber type cushions 29 are provided on the end caps 17 and 25 of the cups 5 and 8, respectively. It will be appreciated that during use of the device as a handset, only one of the cushions 29 bears against the ear of the user, but during use as a headset, both cushions 29 bear against the ears of the user.

In order to convert the handset to a headset, an arm 32 is pivotally connected to the body 1. The arm 32 is arcuate, hollow and typically triangular cross section. The arm 32 terminates at one end in a generally frusto-conical cap 34 which houses a chamber 37 and is pivotally connected to the mouthpiece cup 5 by a sleeve 35 with a radially outwardly extending flange 36 on the outer free end thereof. An opening 38 is provided on the other end 39 of the arm 32. The chamber 37 communicates with the chamber 12 of the mouthpiece cup 5 through the hollow sleeve 35. Thus, sound entering the opening 38 travels through the arm 32 into the chamber 12 to the microphone 15 for transmission.

It is readily apparent that during use of the device as a handset, the arm 32 lies against the body 1 (FIG. 1). Sound emanating from the speaker 19 passes through the opening 20, tubular sections 2, 3 and 4, the tube 22 and the opening 27 to the ear of the user. When the user speaks, the sound enters the chamber 12 through the opening 16 and is transmitted via the microphone 15.

When the user wishes to use the device as a headset (FIG. 2) the body section 4 and tubular section 3 are pulled out of the body section 2, so that the cushions 29 can be placed over both ears of the user, and the arm 32 is rotated around the longitudinal axis of the sleeve 35 into position in front of the mouth of the user. When the user speaks, the sound enters the opening 38 in the end 39 of the arm 32, passes through the arm 32 and the sleeve 35 to the chamber 12 and the microphone 15.

During use as a handset, the device is relatively rigid since the tubular body sections 2, 3 and 4 are slid together in overlapping relationship. When the sections 2, 3 and 4 are slid apart, i.e. extended, the device is relatively flexible for wrapping around the head of a user. The body 1 and the arm 32 are preferably formed of high impact plastic or nylon. Sound insulation can be provided in the partition 10 to accoustically isolate chamber 12 from chamber 13. A spring loaded hinge can also be provided between the earpiece cup 8 and the body 1 so that the earpiece readily adapts to a user's ear when the device is being used as a handset. Finally, and again when used as a headset, the speaker 19 can be mounted in the earpiece cup 8.

It will be appreciated that the usual wires and connections have been omitted for the sake of simplicity. However, the device may be wired in essentially the same manner as conventional telephone handsets, and indeed be of the "wireless remote" type.

Thus, there has been described a relatively simple telephone device which can be used as a handset or headset, the conversion from one form to the other being readily effected.

What we claim is:

1. A combination telephone handset and headset device comprising elongated, extensible body means; mouthpiece means at one end of said body means; earpiece means at the other end of said body means; microphone means in said mouthpiece means for transmitting sound made by the user of the device; speaker means for receiving sound signals sent to the user of the device in said body means; and tubular arm means pivotally connected to said body means at the mouthpiece end thereof for rotation between handset and headset positions, whereby the device can be used in the same manner as a conventional handset, or by extension of said body means and rotation of said arm means into close proximity with the mouth of a user, used as a conventional headset.

2. A device according to claim 1, wherein said body means includes at least two arcuate, telescopically interconnected sections, one said section carrying said mouthpiece means, and the at least a further said section carrying said earpiece means.

3. A device according to claim 2, wherein said arm means is pivotally connected to said mouthpiece means for rotation between the handset and headset positions.

4. A device according to claim 3, wherein said mouthpiece means, said earpiece means and said body means are hollow; partition means in said mouthpiece means dividing the interior thereof into a receiver chamber containing said speaker means and a transmission chamber containing said microphone means, said receiver chamber communicating with said earpiece means, through said body means.

5. A device according to claim 4, including tube means in said earpiece means extending through said body means for receiving sound from said receiver chamber and carrying the sound to said earpiece means.

6. A device according to claim 5, including sleeve means pivotally connecting said arm means to said body means for facilitating the passage of sound through said arm means into transmission chamber.

7. A device according to claim 5 including hinge means coupling said earpiece means to said body means to facilitate adjustment to the head of the user.

* * * * *